United States Patent Office 3,707,514
Patented Dec. 26, 1972

3,707,514
SYNTHETIC ORGANIC PIGMENTS AND METHOD FOR THEIR PRODUCTION
Anthony E. Vassiliades, Deerfield, Shrenik Shroff, Lake Forest, and Edward F. Nauman, Chicago, Ill., assignors to Champion International Corporation, New York, N.Y.
No Drawing. Continuation-in-part of application Ser. No. 786,337, Dec. 23, 1968. This application Nov. 6, 1970, Ser. No. 87,654
Int. Cl. B01j 13/02; C08j 1/14
U.S. Cl. 260—2.5 F      20 Claims

ABSTRACT OF THE DISCLOSURE

Synthetic organic pigments are provided by the activation of precursor microcapsules formed by the addition of a partially condensed formaldehyde resin to an admixture of an aqueous solution of a hydrophobic starch and an oily material and coated onto a substrate.

---

This application is a continuation-in-part of application Ser. No. 786,337 to A. E. Vassiliades, Shrenik Shroff and E. F. Nauman entitled "Microcapsular Opacifier System," which application was filed on Dec. 23, 1968 now U.S. Pat. No. 3,585,149.

This invention relates to synthetic pigment particles and to the method for their production. More particularly, this invention relates to microcapsular opacifying agents which may be coated onto various substrates to produce coatings having unique combinations of desirable properties.

U.S. patent application Ser. No. 786,337 to A. E. Vassiliades et al. entitled "Microscapsular Opacifier System," filed Dec. 23, 1968 now U.S. Patent No. 3,585,149, describes opacifying agents comprising air-containing microcapsules having an average particle diameter below about one micron. Such opacifying agents provide highly opaque surfaces when coated onto and/or incorporated into fibrous and non-fibrous substrates.

It has now been found that synthetic pigment particles that are capable of imparting the properties of high gloss, high brightness, excellent binding to fibers, good printability, and water and oil resistance, in addition to good opacity to substrates, may be provided by the process of the present invention. Surprisingly, it has been discovered that the employment of a hydrophobic starch as the emulsifying agent in the preparation of oil-containing precursor microcapsules yields air-containing microcapsules upon activation, which can be employed as white pigment particles having an exceptional combination of properties which are superior to presently available inorganic pigments.

According to the present invention, dyeable microcapsular opacifying pigments are provided by activating oil-containing precursor microcapsules to expel the oily nucleus from the precursor microcapsule and replace the the oil with air.

Precursor microcapsules having solid walls and containing minute droplets of an oily material are provided by simply admixing:

(A) a solution comprising a partially condensed, formaldehyde condensation product as the solute and water as the solvent, said condensation product being capable of being separated from solution in solid particle form upon dilution with water; and
(B) an oil-in-water emulsion comprising a water-immiscible oily material as the disperse phase and an aqueous, colloidal solution of a hydrophobic starch emulsifying agent as the dispersion medium.

The water of the emulsion is present in a quantity sufficient to cause the separation of said condensation product from solution.

Upon admixture and under brisk agitation, the condensation product is caused to separate from solution in solid particle form about a nucleus of oil and water upon dilution with the water of the emulsion. The oil-containing precursor microcapsules may be activated, by any suitable means. By the term "activated," it is intended to mean the replacement of the oily core material by air. Thus, for example, the precursor microcapsules may be subjected to spray drying in order to drive the oily core material through the microporous walls of the capsules.

By employing the hydrophobic starch emulsifying agent in the preparation of the organic pigments of the present invention, such pigments may be coated onto various substrates, e.g., paper, and provide a multitude of desirable properties, without the need for conventional additives which are ordinarily employed to impart such properties to paper substrates. Thus, coatings of the present pigments provide; an opacity equivalent to or better than titanium dioxide (on a weight basis); high gloss (80+) without any calendering; high brightness without the need for optical brightening agents; good adhesion to the substrate without the need for conventional binders; excellent barrier properties against oil, grease and wax; excellent wet-rub resistance; resistance to solvents including mild alkalis and acids; excellent fold-crack resistance without the addition of plasticizers; good printability; and ease of coloring with relatively low cost dyestuffs. It was highly unexpected that so many advantageous and unique properties could be combined into a single pigment, thereby eliminating the need for additional additives in order to realize the foregoing properties.

As indicated previously, the emulsifying agent of the present invention is a hydrophobic starch. The present starches may be provided by any suitable process. For example, the starch may be rendered hydrophobic by an etherification of the starch in granule form under non-gelatinizing conditions with a monofunctional etherifying agent which provides the starch with ether-linked hydrophobic groups. Thus, the starch granule will become hydrophobic due to the presence of a high percentage of hydrophobic groups. The hydrophobic groups may be, for example, alkyl groups having at least three carbon atoms, aralkyl groups containing at least seven carbon atoms, and the like.

Suitable etherifying agents, which react with ungelatinized granule starch in alkaline media to produce hydrophobic starch, include alkyl halides containing at least three carbon atoms, for example, alkyl chloride or bromide, and substituted alkyl halides such as methallyl chloride; aralkyl halides, for example, benzyl chloride or bromide, p-halo benzyl chloride or bromide, or 3-chloro propenyl benzene; epoxy reagents, for example, phenyl glycidyl ether and allyl glycidyl ether.

The etherification reaction is conducted until the starch becomes hydrophobic and essentially non-gelatinizable. Finally, the starch is fragmented and reduced to submicron-sized particles by treatment with steam under pressure. The starch is not swollen or cooked but is reduced to very fine particles which are mainly in the microscopic or colloidal size range. Such starches are described in U.S. 3,462,283 to Hjermstad et al. the disclosure of which is hereby incorporated by reference.

The partially condensed formaldehyde condensation products of the present invention include A-stage or B-stage resins, i.e., resins not having reached the infusible or insoluble stage. However, the B-stage resins are especially preferred for the purposes of the present invention.

Exemplary of suitable resins are the condensation reaction products of formaldehyde with phenols, such as, hydroxybenzene (phenol), m-cresol and 3,5-xylenol; carbamides, such as urea, triazines, such as melamine; amino and amido compounds, such as, aniline, p-toluenesulfonamide, ethyleneurea and guanidine. Under the influence of heat, these resins change irreversibly from a fusible and/or soluble material into an infusible and insoluble material.

The preferred formaldehyde condensation products employed in this invention are partially-condensed substituted and unsubstituted melamine-formaldehyde, phenol-formaldehyde and urea-formaldehyde resins. These partially condensed resins can be prepared easily according to conventional practices. For example, a melamine formaldehyde partial condensate or syrup, which was used in a number of the examples enumerated below, is prepared by refluxing 125 grams of melamine in 184 milliliters of Formalin (37 percent by weight formaldehyde) neutralized to a pH of 8 with sodium carbonate. The mole ratio of formaldehyde to melamine in this reaction mixture is 2.3 to 1. The reaction continues for about 1 to 1½ hours at a temperature between 92° and 96° C. or until 1 volume of the condensate becomes turbid when diluted with 2 to 10 volumes of water. A substituted condensation product may be produced by adding a small amount about 6 to 15 percent by weight, of methanol, an alcohol, e.g., to the condensate.

The resinous condensate or syrup, either with or without methanol, defines an aqueous solution of a partially-condensed, highly cross-linkable resin, said solution being capable of being diluted up to at least twice its volume before any appreciable separation of the resin from its solution occurs.

After separation of the resin from its solution, the condensation reaction continues with time to effect additional cross-linking of the partially condensed materials. This additional condensation or cross-linking may be accelerated by the application of heat and/or the addition of a catalyst, e.g., ammonium chloride, an amine hydrochloride, or the like, to the precipitated particles. Thus, the microcapsules comprising walls of a thermosetting resin material become harder with the passage of time.

The B-stage melamine and urea-formaldehyde resins are especially preferred in the present invention.

Optionally, a small amount of a stabilizer is added to the thermosetting resin syrup in order to improve the stability of the resin towards heat, light and oxygen. For example, for about 0.3 to 0.5 percent by weight of a conventional stabilizer such as zinc stearate or dibasic lead stearate may be used.

Any suitable oily material may be employed in the process of the present invention. As previously mentioned, the oily material in the precursor microcapsules is driven from the microcapsules and is replaced by air. The oily material of the present invention includes lipophilic materials which are preferably liquid, such as oils, which will not mix with water and which can be driven through the porous, solid walls of the present precursor microcapsules. The oily material may be a low melting fat or wax. However, oils are the preferred oily materials, since they do not require special temperature maintenance during the production of the microcapsules.

In general, the lipophilic nucleus materials may be natural or synthetic oils, fats, and waxes or any combination thereof which can be removed from the microcapsules at the desired temperatures. Among the materials that can be employed in the process of the present invention are: aliphatic hydrocarbons, for example, heptane, octane, decane or mixtures of such materials, for example, mineral spirits products and the like.

The preferred oily materials for employment in the present invention are those oils having a fairly high vapor pressure (high volatility), so that they can be completely and easily expelled through the micropores of the solid-walled microcapsules over a wide range of temperatures, e.g., by the application of moderate amounts of heat, e.g., —32° to 180° C., preferably between about 0° to about 100° C. It is especially preferred to employ oils which can be driven from the microcapsules at temperatures conventionally employed in the drying of paper webs or paper coatings, e.g., about 85° C. Preferred oils for use in the present invention include mineral spirits, benzene, xylene, toluene, styrene monomer, turpentine, and oils having a like volatility.

Microcapsules having an average diameter ranging from below about two microns and preferably less than about one micron, e.g., between about 0.25 and about 0.8 micron may be produced according to the practices of this invention. Brisk agitation is required in order to aid in obtaining very small droplets of the emulsion and, ultimately, very small capsules. Agitation may be achieved by means of a high speed mixer or impeller, by ultrasonic waves or by other conventional means.

Regardless of the manner of providing the oil-containing precursor microcapsules employed, the microcapsules are activated by heating to temperatures which cause the oily material to volatilize and pass through the micropores in the solid walls of the microcapsules. The heating of the microcapsules may take place at any time subsequent to their formation. The oily material may be driven from the microcapsules either before or subsequent to their being coated onto a substrate. For example, a dispersion of the oil-containing microcapsules, which may be then coated onto a substrate. Alternatively, the dispersion of oil-containing microcapsules may be subjected to vacuum distillation, steam distillation or a similar drying process in order to drive the oily core from the microcapsule and replace the oil with air.

The following examples illustrate the production of the synthetic organic opacifying pigments of the present invention and constitute the best modes contemplated for carrrying out the present invention. The ream of paper as employed in the following examples comprises 500 sheets of 25 inch x 38 inch paper or a total of 3300 square feet of paper. Likewise, the paper employed in certain of the following examples is bond paper (32.5 lbs. per ream) having a TAPPI opacity of 73 percent points prior to coating.

EXAMPLE 1

Four hundred grams of mineral spirits are emulsified with 750 grams of a 20 percent by weight starch solution in water in a Waring Blendor. The starch is a benzoyl, substituted granule starch produced in a manner similar to that described in Example 1 of U.S. Pat. 3,462,283. The starch has a D.S. of 0.75.

The emulsification is continued until the average particle diameter of the emulsion droplet reaches the desired size. Subsequently, 250 grams of an aqueous B-stage urea-formaldehyde condensate (60 percent by weight solids) are slowly added to the emulsion with continued agitation in order to induce encapsulation. The resulting microcapsules have an average particle diameter of approximately 0.8 micron.

The oil-containing microcapsules are then coated onto a web comprising 32.5 pounds per ream of bond paper. The coat weight of the microcapsules is 5.99 lbs. per ream. Next, the paper web is dried at a temperature of about 100° C. for a period of time sufficient to remove the mineral spirits from the core of the microcapsules and to replace the oil with air.

The resulting paper has a TAPPI opacity of 92.8 percent points which is equivalent to an 18.9 unit increase over the opacity of the original uncoated paper. The gloss is 78 percent. The adhesion is adequate for printing purposes and the wet-rub resistance is excellent. Oil, grease, and wax barrier properties are excellent and, also, the coating has good fold-crack resistance.

EXAMPLE 2

The procedure of Example 1 is repeated with the exception that 600 grams of mineral spirits are emulsified with 750 grams of a 20 percent by weight aqueous solution of the starch in order to form an emulsion. The resulting microcapsules have an average particle diameter of about 1 micron when coated onto bond paper in the amount of 3.2 lbs. per ream. A TAPPI opacity of 92.2 percent points results, which is equivalent to 19.2 unit increase in opacity over the uncoated paper. Other properties such as adhesion, resistance to water, and fold-cracking, etc., are similar to those achieved with the opacifies of Example 1.

The starch employed in the following examples is that employed in Example 1.

EXAMPLE 3

The procedure of the previous examples is repeated employing 200 grams of mineral spirits which are emulsified with 450 grams of a 20 percent aqueous starch solution. Agitation is continued until the desired particle size is obtained. A B-stage urea-formaldehyde condensate solution (65 percent by weight solids) in an amount of 138 grams is added in order to form the desired microcapsules. Subsequent to the formation of the microcapsules, 15 grams of a 20 percent solution of ammonium chloride are added to the micrrocapsular dispersion.

The microcapsules are coated as before on the bond paper at a coat weight of 6.44 lbs. per ream. The resulting TAPPI opacity is 90.4 percent points. This amounts to an increase in the opacity of the uncoated bond paper by 17.4 units. The results obtained are similar to those of of Example 1, however, the wet-rub resistance increases dramatically. The coating is unaffected by water diluted hydrochloric acid, and other solvents. The gloss is 75 percent and brightness is on the order of 85. (TAPPI Standard MET-T-453.)

EXAMPLE 4

Four hundred grams of mineral spirits are emulsified with 750 grams of a 20 percent aqueous solution of the starch as in the previous examples. Emulsification is continued until the average particle diameter of emulsion droplet is about 0.5 micron. Subsequently, 138 grams of an aqueous solution of a urea-formaldehyde condensate (65 percent by weight solids) are slowly added to the emulsion. Next, 15 grams of a 20 percent aqueous solution of $NH_4Cl$ are added to the capsular coating. Subsequently the microcapsules are coated onto bond paper at a coat weight of approximately 8.5 lbs. per ream.

The paper is dried at a temperature of 177° C. for a period of time sufficient to remove the mineral spirits from the microcapsular core and be replaced with air. The opacity, brightness, and gloss of the resulting paper are measured and then the paper is subjected to supercalendering employing 4 nips at a pressure of 1,000 p.s.i.g. The uncalendered and the supercalendered coated papers have an opacity of 88 percent and 86 percent, respectively, and the uncoated bare stock has an opacity of 75 percent points.

The opacified coated paper has a brightness of 78.4 prior to supercalendering and 79.1 brightness thereafter. The coated paper has a 68 percent gloss and after calendering it increases to 83.0 percent gloss.

As seen from the foregoing example, high opacity, brightness, and gloss are obtained by the process of the present invention with little or moderate calendering and there is a very small change in opacity when the coated paper is subject to supercalendering pressures.

EXAMPLE 5

One hundred-fifty grams of styrene monomer are emulsified with 75 grams of a 20 percent by weight of an aqueous solution of a benzoyl-substituted starch solution in water in a Waring Blendor. Next, 10 grams of a urea-formaldehyde condensate (65 percent by weight solids) are added to the emulsion to form microcapsules. Thereafter, 4 parts of ammonium chloride per 100 parts of dry solids of the microcapsular coating are added to the dispersion. The ammonium chloride is added from a 20 percent aqueous solution.

The oil-containing microcapsules are then coated onto bond paper at a coat weight of 3.48 lbs. per ream. Next the paper web is dried at a temperature of about 150° C. for a period of time sufficient to remove the mineral spirits from the core of the microcapsules and replace the oil with air. The resulting paper has a TAPPI opacity of 93.3 percent points which is equivalent to 20.0 unit increase over the opacity of the original uncoated paper.

EXAMPLE 6

Styrene monomer, in an amount of 37.5 grams and 112.5 grams of xylene are emulsified with 75 grams of 20 percent by weight starch solution in water in a Waring Blendor. The emulsification is continued until the average particle diameter of the emulsion droplet is the desired size. Subsequently, 10 grams of an aqueous B-stage urea-formaldehyde condensate (65 percent by weight solids) are slowly added to the emulsion with continued agitation. The resulting microcapsules have an average particle diameter of about 1.0 micron.

The oil-containing microcapsules are then coated onto a paper web. The bond paper is coated with microcapsules at a coat weight of 7.8 lbs. per ream. Next, the paper web is dried at a temperature of about 170° C. for a period of time sufficient to remove the mineral spirits from the core of the microcapsules and replace the oil with air. The resulting paper has a TAPPI opacity of 93.1 percent points which is equivalent to 20.1 unit increase over the opacity of the original uncoated paper. The brightness and gloss are equivalent to those obtained in Example 4.

EXAMPLE 7

One hundred grams of purified turpentine which contain 0.75 gram of n-butyl peroxipivilate are emulsified with 100 grams of a 22.5 percent aqueous substituted starch solution in the Waring Blendor. The emulsification is continued until the average particle diameter of the emulsion droplet is approximately 0.8 micron. Subsequently, 40 grams of an aqueous B-stage urea-formaldehyde condensate (65 percent by weight solids) are slowly added to the emulsion with continued agitation. Twenty-five grams of a 20 percent solution of ammonium chloride in water are added to the microcapsular coating.

The oil-containing microcapsules are then coated onto a paper web. The bond paper is coated with 3.77 lbs. per ream of microcapsules. Next, the paper web is dried at the temperature of about 170° C. for a period of time sufficient to remove the mineral spirits from the core of the microcapsules and replace the oil with air.

The resulting paper has a TAPPI opacity of 93.1 percent points which is equivalent to a 19.2 percent units increase over the opacity of the original uncoated paper.

This paper was subsequently supercalendered empoloying 4 nips at a nip pressure of 800 p.s.i.g. Both the uncalendered and the supercalendered coated papers have opacities of 93 percent points and 90.1 percent points, respectively, indicating that there was no appreciable loss in opacity by subjecting the paper to moderate calendering pressures.

EXAMPLE 8

Four hundred grams of mineral spirits are emulsified with a mixture of two starches; namely, 150 grams of the substituted starch previously employed (20 percent by weight) and 400 grams of Clearsol starch in a 30 percent solution. The emulsion is subjected to brisk agitation until the particle size is in the range of 0.8 to 1 micron. Next, 145 grams of an aqueous urea-formaldehyde condensate (65 percent by weight solids) are added to the emulsion, forming microcapsules. Thereafter, 25.0 grams of ammonium chloride is added to the dispersion from a 20 percent aqueous solution. The microcapsular dispersion is subsequently coated into bond paper at a coat weight of 4 lbs. per ream. The resulting paper has an opacity of 89.4 percent points which represents an increase in opacity of 16.4 units over the uncoated paper.

As seen from the foregoing examples, the employment of the process of this invention results in colored and white opacifying agents which have a variety of commercially significant properties. The present opacifiers exhibit high alhesion to base stock and may be employed for all kinds of printing. Additionally, the present pigments show excellent web-rub resistance, good barrier properties to organic solvents, such as ink, grease, oil and paraffin, excellent printing properties, and high gloss. The high gloss, excellent fold crack properties and excellent color uniformity properties of the present opacifying agents render them extremely useful for use in providing gift wrap (both white and colored), box wrap folding box board (both white and colored), milk carton stock, i.e., under polyethylene film, for example, as wax paper and paper board, label paper (such as labels applied to canned goods), menus, party papers, including table cloths and favors, safety papers, soaking labels, and the like.

Although the invention has been described in considerable detail with particular reference to certain preferred embodiments thereof, variations and modifications may be effected within the spirit and scope of the invention as described herein and before, and as defined in the appended claims.

What is claimed is:

1. A process for the production of precursor opacifying microcapsules, which comprises admixing:
    (A) a solution comprising a thermosettable partially condensed, formaldehyde condensation product as the solute and water as the solvent, said condensation product being capable of being separated from solution in solid particle form upon dilution with water; and
    (B) an oil-in-water emulsion comprising a water-immiscible oily material as the disperse phase and an aqueous colloidal solution of a hydrophobic starch emulsifying agent as the dispersion medium;
the water of said emulsion being present in a quantity sufficient to cause separation of said condensation product from solution.

2. The process of claim 1, wherein the formaldehyde condensation product is urea-formaldehyde.

3. The process of claim 1, wherein the starch contains hydrophobic groups which are alkyl groups having 3 to 12 carbon atoms or aralkyl groups having 7 to 12 carbon atoms.

4. The process of claim 3, wherein said hydrophobic groups are benzyl groups.

5. The process of claim 3, wherein said hydrophobic groups are methallyl groups.

6. The process of claim 3, wherein said hydrophobic groups are allyl groups.

7. The process of claim 1, wherein said precursor microcapsules are activated to provide air-containing microcapsules.

8. The process of claim 7, wherein said precursor microcapsules are heated to replace the oily core material with air.

9. The process of claim 8, wherein said precursor microcapsules are heated by being introduced into a spray drier.

10. The process of claim 8, wherein said precursor microcapsules are coated onto a substrate and thereafter activated.

11. Microcapsular opacifiers consisting essentially of air-containing microcapsules having walls comprising a thermosetting formaldehyde condensation product and a hydrophobic starch.

12. The microcapsular opacifiers of claim 11, wherein the formaldehyde condensation product is either urea-formaldehyde or melamine-formaldehyde.

13. The microcapsular opacifiers of claim 11, wherein the starch contains hydrophobic groups which are alkyl groups having 3 to 12 carbon atoms or aralkyl groups having 7 to 12 carbon atoms.

14. The microcapsular opacifiers of claim 13, wherein said hydrophobic groups are benzyl groups.

15. The microcapsular opacifiers of claim 13, wherein said hydrophobic groups are methallyl groups.

16. The microcapsular opacifiers of claim 13, wherein said hydrophobic groups are allyl groups.

17. Precursor opacifying microcapsules consisting essentially of oil-containing microcapsules having walls comprising a thermosetting formaldehyde condensation product and hydrophobic starch.

18. The precursor microcapsules of claim 17 wherein the formaldehyde condensation product is urea-formaldehyde or melamine-formaldehyde.

19. The precursor microcapsules of claim 17 wherein the starch contains hydrophobic groups which are allyl groups having 3 to 12 carbon atoms or aralkyl groups having 7 to 12 carbon atoms.

20. The precursor microcapsules of claim 19, wherein the hydrophobic groups are benzyl groups.

References Cited
UNITED STATES PATENTS 3,585,149   6/1971   Vassiliades   260—2.5 F MURRAY TILLMAN, Primary Examiner M. FOELAK, Assistant Examiner U.S. Cl. X.R.

117—155 L; 260—2.5 B, 38, 39 R